United States Patent [19]

Garuet-Lempirou

[11] Patent Number: 5,712,803
[45] Date of Patent: Jan. 27, 1998

[54] METHOD OF ACQUIRING AND DIGITIZING OBJECTS THROUGH A TRANSPARENT WALL

[75] Inventor: Jean-Claude Garuet-Lempirou, Limoges, France

[73] Assignee: Kreon Industrie, Limoges, France

[21] Appl. No.: 669,985

[22] Filed: Jun. 21, 1996

[30] Foreign Application Priority Data

Jun. 23, 1995 [FR] France ................... 95 07591

[51] Int. Cl.$^6$ ................. A61B 5/107; A61B 5/103
[52] U.S. Cl. ................. 364/560; 359/458; 382/154; 356/376
[58] Field of Search ............... 364/560, 927.1; 359/458; 369/112; 382/157; 356/376

[56] References Cited

U.S. PATENT DOCUMENTS

| | | | |
|---|---|---|---|
| 4,653,109 | 3/1987 | Lemelson et al. | 382/34 |
| 4,796,997 | 1/1989 | Svetkoff et al. | 356/376 |
| 4,935,635 | 6/1990 | O'Hara | 250/560 |
| 5,024,529 | 6/1991 | Svetkoff et al. | 356/376 |
| 5,128,880 | 7/1992 | White | 364/550 |
| 5,164,793 | 11/1992 | Wolfersberger et al. | 356/376 |
| 5,195,030 | 3/1993 | White | 364/401 |
| 5,237,520 | 8/1993 | White | 364/560 |
| 5,339,252 | 8/1994 | White et al. | 364/468 |
| 5,361,133 | 11/1994 | Brown et al. | 356/376 |
| 5,377,011 | 12/1994 | Koch | 356/376 |
| 5,539,677 | 7/1996 | Smith | 364/560 |

FOREIGN PATENT DOCUMENTS

| | | |
|---|---|---|
| 362029 | 4/1990 | European Pat. Off. . |
| 2642833 | 10/1990 | France . |
| 2685764 | 2/1993 | France . |

OTHER PUBLICATIONS

Rioux, "Color 3-D Electronic Imaging of the Surface of the Human Body", 1994.
Rioux et al., "White Laser, Synced Scan", May 1993.
Sato et al., "Three-Dimensional Shape Reconstruction by Active Rangefinder", 1993.
Luo et al., "3D Object Recognition Using a Mobile Laser Range Finder", 1990.
Tanaka et al., "High-Speed Processing for Obtaining Three-Dimensional Distance Image and Its Application", 1991.

Primary Examiner—Emanuel T. Voeltz
Assistant Examiner—Patrick Assovad
Attorney, Agent, or Firm—Bachman & LaPointe, P.C.

[57] ABSTRACT

In a method of and system for acquiring and digitizing an object through a transparent wall the system for acquiring and digitizing sections of objects includes a plurality of sensors carried by a common cradle. The sensors include a laser source emitting a lamellar beam forming a laser plane and two cameras observing the object. The various laser planes are coplanar and form a single measurement laser plane. Devices are provided for calculating and synchronizing the observed images. The support for the object to be measured has a non-plane surface. A preliminary phase includes calibration of the measuring space and acquisition and digitization of the surfaces of the transparent wall. Applications include acquiring and digitizing the shape of the human foot or a rubber seal for automobile doors when subjected to compression loads.

21 Claims, 3 Drawing Sheets

METHOD OF ACQUIRING AND DIGITIZING OBJECTS THROUGH A TRANSPARENT WALL

BACKGROUND OF THE INVENTION

1. Field of the Invention

The invention concerns a method of acquiring and digitizing objects through a transparent wall, in particular a non-plane transparent wall.

The invention also concerns a system for implementing a method of this kind.

2. Description of the Prior Art

There are many prior art optical sensor systems. In particular, French patent FR B 2 685 764 discloses a system for three-dimensional acquisition and digitization of the shape of warped parts. To this end the system includes an optical sensor with a source of laser radiation and one or more cameras analyzing the trace of the laser beam on the object under study.

To be more precise, the system generated a "laser plane", that is to say a sectoral lamellar beam that is very thin but the width of which is sufficient to cover all or part of the object to be analyzed, with the aforementioned cameras viewing the plane at different angles of incidence. To acquire and digitize the surface of an object, the part must be scanned by the laser plane. In this way the surface of the part is acquired progressively in three dimensions. The scanning can be effected by pivoting or translatory movement of the sensor relative to the part. Scanning can also be achieved by holding the sensor fixed and moving the part relative to it.

The above patent also discloses arrangements for miniaturizing the structure of the sensor, in particular by folding the laser beam. This arrangement enables use of the sensor in a very restricted space, for objects that are small in size with great accuracy in a small field.

This type of sensor fulfills its functions perfectly in this context.

There are nevertheless other requirements in which a system of the above kind is not practicable. This includes all applications in which it is necessary to operate through a transparent window, possible a non-plane transparent window. For simplicity, these applications can be divided into two main families.

In a first family of applications, the object rests on a support with a complete "view" of the sections of the object, including at the limits of the support. This enables the environment of the object to be plotted in a real situation.

A typical example of the first family of applications is the digitization of a human member and in particular of a human foot to plot its volume, for at least some of its dimensional characteristics, for example the shape of the sole of the foot. To give one non-limiting example, acquisition of the complete shape of the foot enables shoes to be made to measure. In this case, for the acquisition and digitization operation to be carried out properly it is necessary for the digitized foot to be in an environment resembling a shoe as closely as possible. To this end the foot is enclosed in a support stocking to simulate the pressure of the leather of the shoe. It also rests on a transparent plate reproducing as closely as possible the shape of the "insole", which is the piece of leather on which the foot rests in a shoe. It is based on a sheet of glass or a similar material. This arrangement enables the closest possible simulation of the way the foot is really supported in a shoe.

The second category of applications concerns objects that are deformed by physical loads. A rubber seal for use in automobiles will be considered by way of example. The seal is deformed when the door is closed. It is its profile when deformed by the door that determines whether or not the vehicle is properly scaled. The optimized profile is usually calculated by computer-aided design (CAD). Theoretical profiles are calculated, after which the loads applied to the seal are simulated on a computer, using finite element modeling software. This enables the likely deformations to be visualized. It is then necessary to construct a prototype seal, of course, and to validate the CAD calculations, i.e. to test it in a real life situation. TO do this it is necessary to "seize" the shape of the seal when compressed in the best possible way, i.e. in the "vehicle with door closed" condition. It will be apparent that this test is difficult to carry out properly since it implies "real-life" digitization and visualization of the deformation of the seal.

To do this a reference door is made form a transparent material. It is then possible, using an optical sensor, to digitize continuously the seal crushed by the reference door, through the latter since it is transparent.

When the data characterizing the digitized profile has been acquired, it can be input in an appropriate form to the CAD system and compared with the calculated theoretical data. If the differences exceed predetermined limits, the previous steps can be reiterated until a satisfactory result is obtained.

It will readily be understood that this facility has great commercial and financial advantages for the automobile manufacturer concerned.

However, problems arise in both families of applications. The optical sensor in accordance with the above patent application generates a laser beam that is deformed on passing through the transparent wall, a phenomenon that is accentuated if the wall is not plane. The same applies to the reflected light rays picked up by the camera(s) associated with the optical sensor. It is necessary to correlate the pints "seen" by the camera(s) and an absolute frame of reference in order to reconstruct the volume of the object and to deduce therefrom its exact shape, i.e. its shape free of deformations.

The invention is directed to providing a solution to this first requirement.

There is another limitation associated with use of a system in accordance with the previously mentioned application. With a single sensor it is not possible to extract a complete section of an object in three dimensions. This is the case with the human foot as previously referred to.

Consideration might be given to having the sensor perform a complete turn around the object. This solution has drawbacks, however. In practise it is necessary to use a very heavy mechanical device. Secondly, the sensor is connected, at least by a cable, to control devices and devices for processing signals representing the acquired and digitized values: for example, a standard digital signal processing, memory and display system. Indefinite rotation about the object is therefore impossible. It is necessary to carry out the reverse operation to return to the initial or rest state. During this operation, the connecting cable must therefore be "unknotted", which can be difficult. In all cases the system lacks flexibility.

Consideration might be given to using a rotary contact to avoid this problem. This device increases the cost of the equipment and significantly reduces its reliability.

The same problem arises in applications where the object to be digitized cannot be kept immobile for long periods (more than 20 seconds). This is again the case where the aim is to acquire the section of a member of a person, such as a foot.

It is therefore necessary to work fast, which excludes acquisition in a plurality of digitization passes.

In the case of measurements on living members, it may be assumed that the "object" to be measured is relatively soft and that the acquisition time must not exceed around 15 seconds. It should also be clear that the acquisition in question is not that of a single section, but rather a plurality of sections constituting successive slices.

SUMMARY OF THE INVENTION

Accordingly, in one preferred embodiment of the invention, the object under study is surrounded by a plurality of sensors to constitute complete sections of the object in a single pass, that is to say:

generating, by means of a plurality of sensors, a single laser plane completely surrounding the object, so that the cameras associated with the sensors are not obliged to view different laser planes emitted by different sensors in overlapping areas.

synchronizing the measurements form each sensor to obtain homogeneous section portions in a common plane for all the sensors for each measurement; and grouping the data obtained from the various cameras in a single absolute frame of reference to obtain from each measurement plane the required three-dimensional image.

The invention is directed to alleviating the drawbacks of the prior art devices, some of which have just been referred to, and to meeting the stated requirements.

The invention consists in a method of acquiring and digitizing an object through a transparent wall using at least one sensor comprising a laser source emitting a lamellar beam towards said object forming a measurement laser plane and at least one camera observing said object through said transparent wall, said sensor being fixed to a mobile sensor support, said transparent wall being of constant thickness and having a profile that can be scanned continuously by a laser plan orthogonal to one surface of said transparent wall, along a particular axis, said method comprising at lease the following phases:

a preliminary phase comprising at lease the following steps:

a/ definition of a measuring space encompassing said object to be acquired ad digitized;

b/ digitization of said transparent wall in order to determine geometric characteristics thereof relative to a frame of reference;

c/ definition of a displacement profile along said particular axis, inclining said sensor relative to said axis so that said laser plane form said sensor remains at all times perpendicular to said surface of said transparent wall, and calibration of all of said measurement space by means of a calibration pattern moving perpendicular to said transparent wall along said particular axis;

d/ translation of coordinate data acquired and digitized in the above manner into an absolute frame of reference and storage thereof in memory; and a phase of acquisition and digitization of said object comprising at least the following steps:

a/ displacement of said sensor holder along said particular axis in accordance with said displacement profile so that said measurement laser plane remains perpendicular to said transparent wall, b/ acquisition and digitization of all or part of sections of said object in successive slices;

c/ translation of the coordinate data obtained in the above manner to an absolute frame of reference by correlation with said data obtained by calibration of said measurement space and stored in memory.

In the preferred embodiment of the invention, said measurement laser plane being the combination of particular laser planes created by a plurality of optical sensors fixed to said sensor-support and completely surrounding said object, a supplementary step in said preliminary phase consists in rendering the individual laser planes emitted by said lasers coplanar so as to form a single measurement laser plane.

The invention also consists in a system for implementing this method.

The invention also consists in the application to digitization of a human foot, in particular for making shoes to measure.

The invention also consists in the application of the digitization of a loaded compressible seal, in particular for an automobile vehicle.

The invention will be more clearly understood and other features and advantages will emerge from a reading of the following description given with reference to the appended drawings.

DETAILED DESCRIPTION OF THE PREFERRED EMBODIMENT

A typical application of the invention form the first family of applications previously mentioned will be considered first.

The following concrete example refers to the acquisition and digitization of a human foot without limiting the scope of the invention. Similarly, the example relates to a preferred embodiment of the system of the invention, namely a multisensor system.

Figure 1:
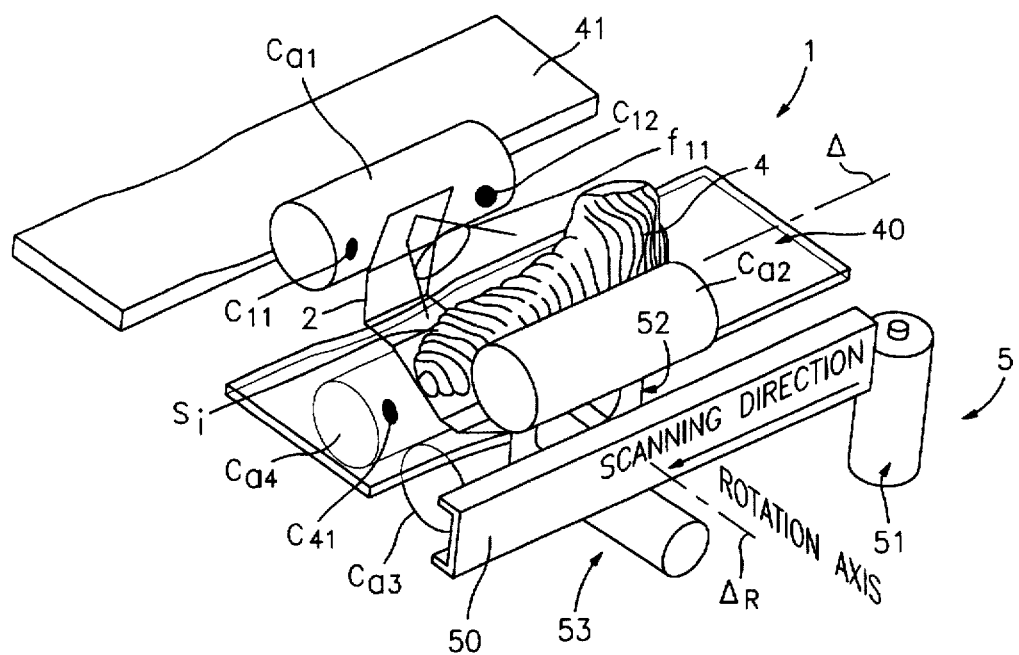
FIG. 1 is a diagrammatic representation of a system for acquiring and digitizing sections of the human foot.

FIG. 1 shows a system 1 for acquiring and digitizing sections of objects through a non-plane transparent wall.

The system includes four optical sensors $C_{a1}$ through $C_{a4}$.

Each of these optical sensors can be similar or even identical to the sensor describe din the previously mentioned French patent FR-B-2 685 764, to which reference may usefully be had for a more detailed description of the sensors. A sensor of this kind essentially comprises a laser source (not shown) generating lamellar beams, for example the beam $f_{21}$. The laser sources are advantageously semiconductor laser diodes.

In accordance with an important feature of the invention, when the system is a multisensor system the four laser planes of the lamellar beams, or more generally the N laser planes of the lamellar beams, are coplanar.

Each sensor $C_{a1}$ through $C_{a4}$ is provided with at least one camera, advantageously two cameras, for example the cameras $C_{11}$–$C_{12}$ in the case of the sensor $C_{a1}$, the two cameras being on opposite sides of the laser sources.

The four sensors $C_{a1}$ through $C_{a4}$ are attached to a cradle 2, for example a circular cradle, so that they surround the object to be digitized, in this example the foot 4.

The laser planes of the four beams being coplanar, the cameras observe the same section $S_i$ of the foot 4. The output signals of the cameras are transmitted via connection $l_1$ through $l_4$ to a signal processor system 3 that carries out the acquisition and digitization. To this end the signals from the cameras are first converted to digital signals, in the conventional way, if the cameras are of the analog type. This conversions can be carried out within the physical limits of the sensors $C_{a1}$ through $C_{a4}$. There are also digital cameras that supply digital signals representative of the sensed image directly. The signal processing unit 3 acquires and digitizes the section on the basis of these signals. It advantageously includes stored program calculation units $C_{a1c}$. These are provided with appropriate interface cards (not shown) for communication with the cameras, for example the cameras $C_{11}$–$C_{12}$. The links are usually bidirectional or in the form of pairs of unidirectional links, to transmit instructions and commands to the cameras and to the laser sources and to the units driving movement of the sensor support, and to receive the camera output signals. Various conventional devices are naturally provided, such as power supplies for the components of the sensors $C_{a1}$ through $C_{a4}$.

The signal processing unit 3 further includes a memory $M_{em}$ for storing data and programs. It may be part of the calculation units $c_{a1c}$ or external (as in the example shown). It finally includes a visualization display unit $V_{isu}$, for example a cathode ray tube display, and various other conventional circuits (not shown): fixed memory, etc.

All these arrangements are conventional in themselves and well known to the person skilled in the art. There is therefore no need to describe them further.

By way of non-limiting example, the acquisition technique disclosed in the aforementioned French patent may be used, with particular reference to FIGS. 7 through 10d of that patent and the associated description.

However, although that technique is perfectly suitable in the case of a single sensor, it is not sufficient in itself in the context of the invention because the preferred embodiment uses a plurality of sensors, four sensors in the example described.

The plots by each sensor $C_{a1}$ through $C_{a4}$ must be carried out in a synchronized manner to obtain homogeneous section portions $S_i$ in the same plane for all the sensors on each measurement.

It is also necessary to group the data obtained from the various cameras in a single absolute frame of reference (x, y, z axes) to obtain the required three-dimensional image from each measurement plane.

To this end the sensors are calibrated for all of the digitization space, as explained below.

The foot 4 to be measured rests on a base 40 in the form of a plate of transparent material. The other foot (now shown) can rest on a base 41 parallel to the first foot but outside the space occupied by the sensors $C_{a1}$ through $C_{a4}$.

To obtain a three-dimensional image of the foot it is necessary to acquire sections $S_i$ associated with successive section planes. It is obviously not possible to move the foot 4 forward, since it is required to remain immobile on the base 40. It is therefore the optical sensors $C_{a1}$ through $C_{a4}$ fixed to their cradle 2 that must be moved in translation along the axis A, which is the longitudinal axis of the foot 4.

To this end a device 5 is provided for driving the digitization system 1, to be more precise for driving the cradle 2. In the example described it includes a drive motor 51 driving a pulley gear unit 52 rotating about a rotation axis $\Delta_R$ and a straight guide rail 50. The drive device 5 obliges the cradle 2, and therefore the sensors $C_{a1}$ through $C_{a4}$ associated with the latter, to move in translation along the straight guide rail 50 by a are determined amount. It also includes a second motor 53 which, via the pulley and gear unit 52, pivots the cradle about the rotation axis $\Delta_R$, for reasons explained below. The sensor displacement profile has to achieve continuous movement (and therefore the fastest possible movement) during digitization. The sensors move continuously. The displacement is not effected in "step" mode under the control of the data processor units 3, but with the spatial position of the sensors continuously recalculated, for example by providing the motors with resolvers and counting encoder wheel "pulses". It is then possible to associate all of the section portions from each sensor camera with the spatial coordinates of the sensor.

During this translatory movement a number of series of successive measurements are carried out. Each series of measurements is associated with an acquired section $S_i$ corresponding to a section plane. If the number of successive section planes is sufficiently high, it is possible to acquire and plot the external volume of the foot 4' in "wire mesh" form or to use any known data processing method to "smooth" the latter. The various signals are processed by the signal processor unit 3 shown in FIG. 1.

When the data has been acquired and stored in memory, it can obviously be processed subsequently in the conventional way to control automatic devices for creating component parts of a shoe that will fit perfectly the foot measured and digitized in this way.

However, as indicated in the preamble to the present description, it is desirable for the foot 4 that is to be measured to rest on a non-plane surface 40 reproducing as exactly as possible the shape of the inside surface of a shoe. The laser beam(s) generated by the laser source(s) associated with the sensors under the plate (in this example the sensors $C_{a3}$ and $C_{a4}$) are deformed on passing through the non-plane transparent wall, i.e. the support 40 for the foot 4. Likewise the reflected rays picked up by the camera(s) associated with these sensors $C_{a3}$ and $C_{a4}$. It is necessary to correlate the points "seen" by the cameras and an absolute frame of reference in order to plot the volume of the foot and to deduce therefrom its exact shape, i.e. its shape free of optical distortion.

It is therefore necessary to carry out an initial calibration step to acquire the exact dimensional characteristics of the non-plane wall so that it is possible to translate the points observed by all of the cameras, i.e. points in a relative frame of reference, distorted by the deformation of the beams due to the fact that the wall 40 is non-plane, into an absolute frame of reference.

This initial calibration step will be described in the most general case. As indicated in the preamble to the present description, the method of the invention is totally compatible with plane walls, it being understood that non-plane walls accentuate the problems encountered.

The transparent wall can therefore be generally defined as a wall adapted to be scanned continuously by a laser plane orthogonal to one surface of the wall. Another requirement is that the wall is of constant thickness.

A wall of this kind may be:

a plane wall, which constitutes a special case;

a wall with regular surfaces developed by translation from a continuous curve;

a cylindrical surface wall;

a surface of revolution wall developed from a regular curve by rotation about a common axis;

a spherical surface wall, which constitutes a special case of the previous case.

The support plate calibration process comprises a number of steps. The process will be explained with reference to FIGS. 2 and 3.

Figure 2:
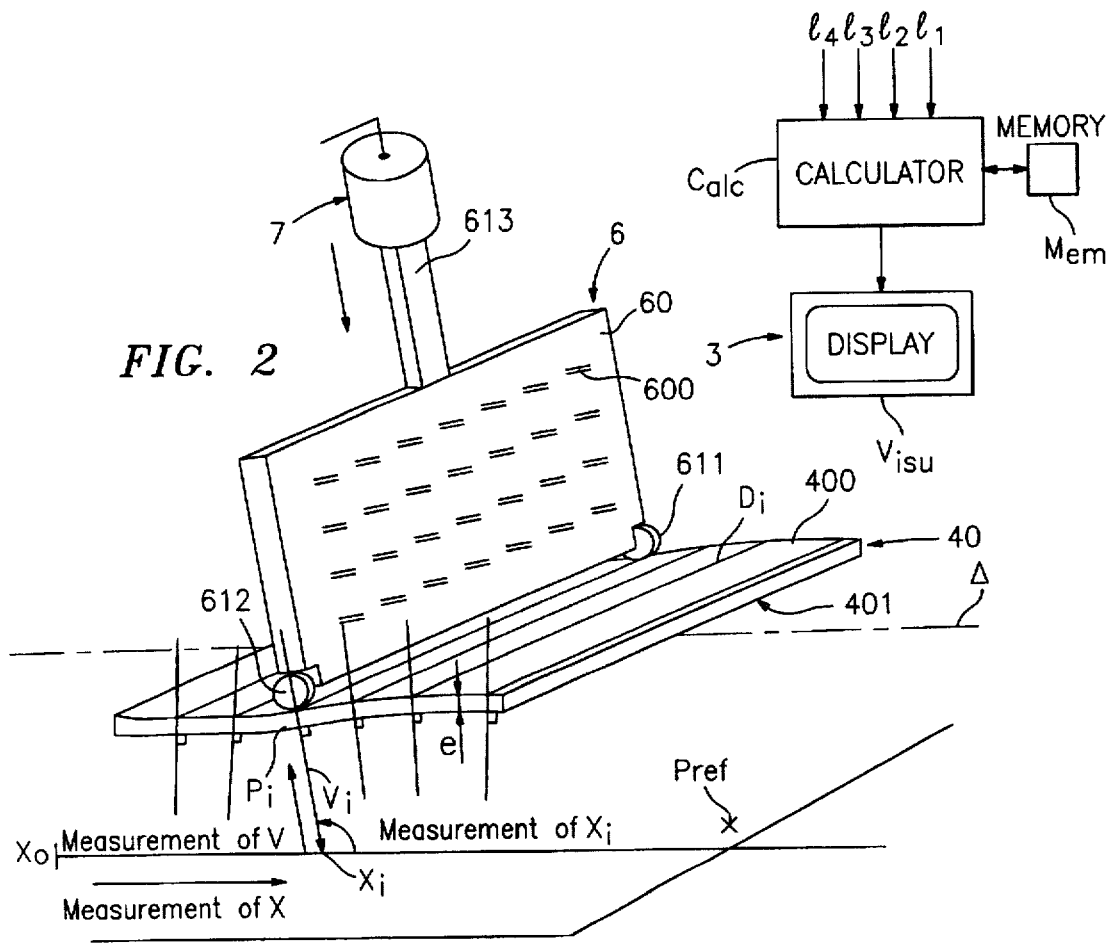
FIG. 2 illustrates the calibration phase of a system of this kind.

FIG. 2 shows a portion of the transparent material support plate 40. A test pattern 6 is used to carry out the calibration. It is in the form of a plate 60 carrying pins 600 arranged in a regular matrix array of rows and columns.

The laser planes, constituted by the partial beams from the sensors $C_{a1}$ through $C_{a4}$, for example the beam $F_{11}$, intersect the pins 600 and the sensor cameras (not shown) see a series of points corresponding to those intersections. Conversion matrices are then calculated which associate a pixel of each sensor camera $C_{a1}$ through $C_{a4}$ with a point in space associated with the plane, formed by the sensor support 2, associated with a relative frame of reference (U, V, W) or relative space. Knowing the position of the mobile sensor support cradle 2 relative to a fixed "hard" frame of reference (R, S, T) consisting of the test pattern 60 carrying the pins 600, the coordinates in an absolute space (X, Y, Z) can be calculated.

The calculation can be carried out as explained in French patent application FR-A 2 642 833.

There is described a method of calibrating a shape acquisition system including a mobile sensor system adapted to deliver coordinates (x, y, z) representing the partial shape of a three-dimensional object in an absolute frame of reference (X, Y, Z). The method establishes the global transfer function between raw data associated with a relative frame of reference (u, v, w) delivered by the sensor system of the acquisition system and the real coordinates (x, y, z) of the surface of the object being acquired. The fixed test pattern is associated with a frame of reference with coordinates (r, s, t). The translation from one system of coordinates to the other is effected by means of a conventional matrix calculation.

The sensor system described is naturally a single sensor system, unlike that in the preferred embodiment of the invention which includes a plurality of sensors attached to the cradle 2 (four sensors in the example shown). All of the measurements carried out by the various sensors $C_{a1}$ through $C_{a4}$ must be taken into account, after synchronization. It is this set of measurements that defines the coordinates (u, v, w) of the relative frame of reference (U, V, W). It is naturally necessary for the various beams to overlap on the pins 600.

Furthermore, in the case of digitization through a non-plane surface 40 other parameters must be acquired during the initial calibration, because of the curvature of the support. It is necessary to define a continuous profile of the displacement of the laser plane, the latter remaining at all times perpendicular to the bottom surface 401 of the plate 40.

To this end, the bottom surface 401 of the plate 40 is defined relative to a reference plane $P_{ref}$ which by convention is below it. The plane $P_{ref}$ is advantageously assumed to be horizontal. There are therefore three parameters to be acquired and digitized for any point $p_i$ on the plate 40 along the axis $\Delta$ (FIG. 1). Finally, its thickness "c" being constant, knowing the dimensional characteristics of the bottom surface 401 enables the dimensional characteristics of the top surface 400 to be deduced.

The parameters that must be acquired and digitized are therefore as follows: the distance $x_i$ of any point $p_i$ on the bottom surface 401 from an origin abscissa $x_O$, the distance $v_i$ between $p_i$ and $x_i$ (the straight line segment $p_i$-$x_i$ being perpendicular to the surface 401 at $p_i$) and the angle $\alpha_i$ between the straight line segments $v_i$-$p_i$ and the abscissa axis. The abscissa axis x is parallel to the axis $\Delta$.

To calibrate the working space above the top surface 400, now that the profile of the displacement of the laser plane perpendicular to this surface has been defined, the test pattern 6 is attached to the sensor support cradle 2 (FIG. 1). To enable the closest possible calibration of the transparent plate, the calibration test pattern 6 moves at a constant distance, the smallest possible distance, from the plate 40. It is moved by rolling means. To this end it is provided with respective rollers 611 and 612 on opposite sides of the pin support plate 60. This enables it to roll on the top surface 400 of the transparent plate 40. Finally, its upper part is provided with a rod 613 mechanically coupled to a sensor 7 that measures the displacement $v_i$ at any point $p_i$.

By virtue of these provisions, the plane formed by the plate 60 of the test pattern 6, which is coincident with the aforementioned single measurement laser plane of the sensors, remains at all times perpendicular to the surface 400 and therefore to the surface 401.

To summarize, the displacement sensor 7 provides the measurement $v_i$ which determines in conjunction with the measurements $x_i$ and $\alpha_i$ the exact position of the calibration test pattern 6 and therefore of the pins 600 themselves. In other words, $\alpha_i$ is obtained from $x_i$ by digitizing the surface 401 and then $v_i$ is obtained from $x_i$ and from $\alpha_i$ by carrying out the calibration of the measurement space. In practise a fine digitization is carried out (x axis displacement in steps of 1 mm) allowing for the shape of the transparent plate.

Figure 3:
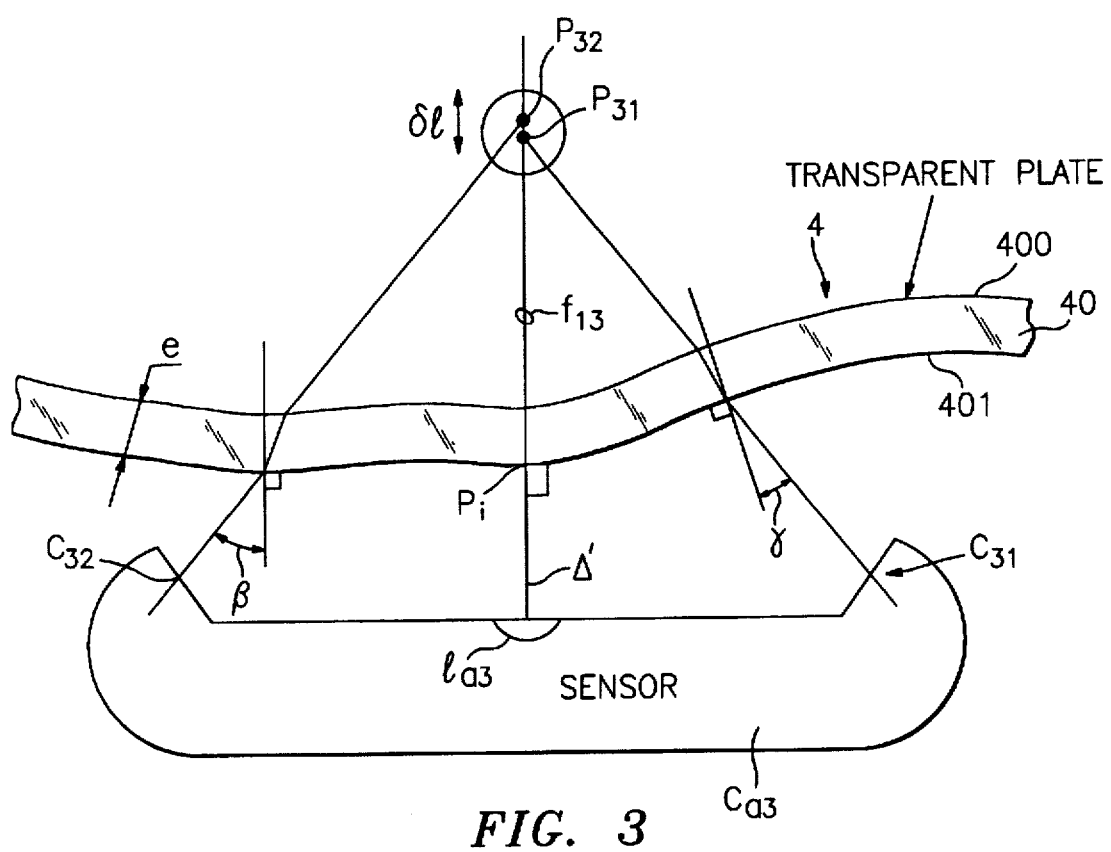
FIG. 3 shows the problems associated with refraction through a non-plane wall.

As shown more particularly in FIG. 3, which is a cross-sectional view of a portion of the plate 40 to a larger scale, the cameras do not "see" perpendicularly to the transparent surface. This figure shows one of the sensors under the plate 40, in this example the sensor $C_{a3}$. It has two cameras $C_{31}$ and $C_{32}$.

The deformations of the plate cause the cameras $C_{31}$ and $C_{32}$ to "see" differently, in other words the optical path is different because the angles of incidence $\beta$ and $\gamma$ of the cameras relative to the transparent plate are different. The laser source $l_{a3}$ of the sensor $C_{a3}$ emits a lamellar beam $f_{13}$ on an emission axis $\Delta'$ orthogonal at $p_i$ to the bottom surface 401 of the plate 40. The cameras $C_{31}$ and $C_{32}$ see points $P_{31}$ and $P_{32}$ offset along the axis $\Delta'$, the distance between the points $P_{31}$ and $P_{32}$ being equal to $\delta1$ because of the different angles of refraction $\beta$ and $\gamma$.

The purpose of the calibration is thus to define the three dimensional data plotting parameters for each camera according to the basic data of the previously defined displacement profile: parameters $x_i$, $\alpha_i$ and $v_i$.

The transparent plate being of constant thickness, as already mentioned, there are two methods for defining a displacement profile, either on the basis of the digitization of the top surface 400 or on the digitization of the bottom surface 401.

The first method will be explained with reference to FIG. 1. This method comprises the following phases and steps:

a/ sensor calibration phase:

step I: the laser beams from the sensors $C_{a3}$ and $C_{a4}$ under the plate 40 are turned off, those above the latter being turned on (for example beam $f_{11}$ from sensor $C_{a1}$);

step II: calibration of the cameras (for example $C_{11}$–$C_{12}$) of the sensors $C_{a1}$ and $C_{a2}$ above the plate 40, no rotation, on a single section plane of the space; the test pattern 6 (FIG. 2) is therefore not moved in this step and the calibration parameters are calculated from a single digitization of the test pattern 6;

b/ plate 40 digitization phase:

step I: blanking of the top surface 400 of the plate 40;

step II: scanning of the surface 400 by the common laser plane, without rotation of the latter;

step III: determination of the working area for subsequent elimination of unwanted points that might be plotted below the top surface 400 of the plate 40.

The second method will now be explained. This method includes the following phases and steps:

a/ sensor calibration phase:

step I: demounting (removal) of the plate 40;

step II: the laser beams from the sensors $C_{a1}$ and $C_{a2}$ are over the plate 40 are turned off, those under it being turned on;

step III: calibration of the cameras (for example $C_{41}$) of the sensors $C_{a3}$ and $C_{a4}$ under the plate 40, no rotation, on a single section of the space; the test pattern 6 (FIG. 2) is therefore not moved in this step and the calibration parameters are calculated from a single digitization of the calibration pattern 6; to this end the calibration pattern 6 is lowered as far as possible, so that the pins 600 cover the space previously occupied by the bottom surface 401 of the plate 40;

b/ plate 40 digitization phase:

step I: blanking of the bottom surface 401 of the plate 40;

step II: scanning of the surface 401 by the common laser plane, without rotation of the latter;

step III: determination of the working area for subsequent elimination of unwanted points that may be plotted under the top surface 400 of the plate 40, allowing for the constant thickness of the latter.

In a variant of this second method (not shown) when a difficult environment rules out the demounting of the transparent plate to provide a single calibration system, it is necessary to use two calibration patterns, on opposite sides of the plate 40. The second pattern is naturally needed only if the transparent wall 40 has a non-plane profile to be digitized.

Which method is chosen depends on various factors. In particular, the choice of the second method is strongly conditioned by:

the ease of access to the top surface 400 and the bottom surface 401; and whether or not there are sensors above the top surface 400.

In the case of the human foot digitizing system just described, for example, access to the bottom surface 401 requires demounting of the plate 40. In this case the first solution is therefore preferred, since there are two sensors $C_{a1}$ and $C_{a2}$ (in the example described) above the plate 40.

On the other hand, in the case of a difficult environment where it may be assumed access is possible to only one of the surfaces, for example the bottom surface (i.e. a surface outside the measurement space), in which all the sensors are located, the second solution has to be chosen.

The calibration phase is carried out once and for all, at least for a given plate 40, and for a given time period, to allow for any drift in time.

the acquired and digitized characteristics of the plate 40 are converted by the calibration process into an absolute frame of reference and stored in memory. It should be clear that the calibration process is not concerned only with an isolated plane relating to a single position $p_i$, but with all of the measurement space.

Under normal measuring conditions the sensor support 2 is moved by the translatory means 5 along the axis $\Delta$ (FIG. 1). The translatory means 5 are under the control of the signal processing unit 3. The position along the axis $\Delta$ is easy to determine. For each measurement point $p_i$ (acquisition of a section $S_i$), with abscissa $x_i$, the values of $\alpha_i$ and $v_i$ are known from the data stored during calibration. In particular, knowing $\alpha_i$, the rotation drive motor 53 imparts a corresponding rotation to the sensor support and thereby inclines the single measurement laser plane so that the latter remains orthogonal at all points $p_i$ to the surfaces of the plate 40.

The data successively acquired and digitized (section planes $S_j$) can therefore be converted into absolute coordinates knowing the position of the sensor holder 2 along the axis $\Delta$ during acquisition. Note that the data is corrected, and therefore free of errors due to the non-plane shape of the plate 40. Accumulation of the data relating to the various sections acquired and digitized along the axis $\Delta$ plots the exact external shape of the foot 4. As already mentioned, this data is stored in memory for subsequent processing to enable shoes to be made to measure. The acquisition and digitization process can naturally be monitored in situ and in real time by displaying the acquired sections on a display screen. The result may be displayed in "wire mesh" form, for example in "false colours", or using appropriate "smoothing" an interpolation software in a more sophisticated form closer to reality.

A typical application of the method of the invention from the second family of applications will now be described.

This description relates to a design of a compressible, for example rubber seal for an automobile vehicle: door, hatchback, etc.

Figure 4A:
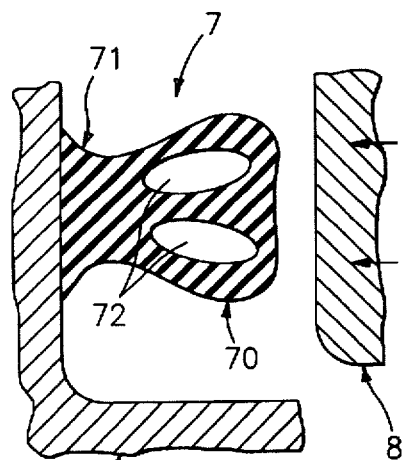
FIGS. 4a and 4b show the behavior of a rubber automobile door seal at rest (door open) and deformed (door closed), respectively.
Figure 4B:
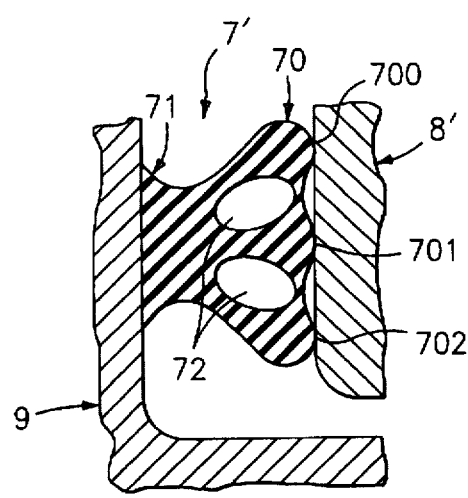

FIGS. 4a and 4b show the behavior of a rubber seal 7 for an automobile door 8 at rest (door open) and deformed (door closed), respectively.

The seal has a base 71 glued or otherwise fixed to the bodyshell 9 of a vehicle and a head 70 that comes into contact with the internal surface of the door 8 and is progressively crushed (position 8' of the door and position 7' of the seal).

FIG. 4b shows the seal 7 subjected to compression loads by the closed door 8'. For a better seal, it is advantageous for the crushed seal (position 7') to have more than one point of contact with the inside surface of the closed door (position 8'). There are three points of contact 700, 701, 702 in the example shown.

The dimensions of the seal 7, the particular profile of the head 70, the possible existence of internal passages 72 and its mechanical properties (elasticity, etc) enable the intended objectives to be achieved.

As already mentioned, a seal of this type is advantageously designed using CAD. These methods can be used to simulate the deformation of the seal when it is loaded and to predict how effective it will be in fulfilling the intended sealing function.

When the "theoretical" design has been completed, it remains to validate the calculations by constructing a prototype in accordance with them and testing the prototype under real conditions of use. At this stage it is therefore necessary to measure and to visualize the actual deformation with the door closed.

The method of the invention can be sued to digitize such deformation continuously and to visualize it.

Figure 5A:
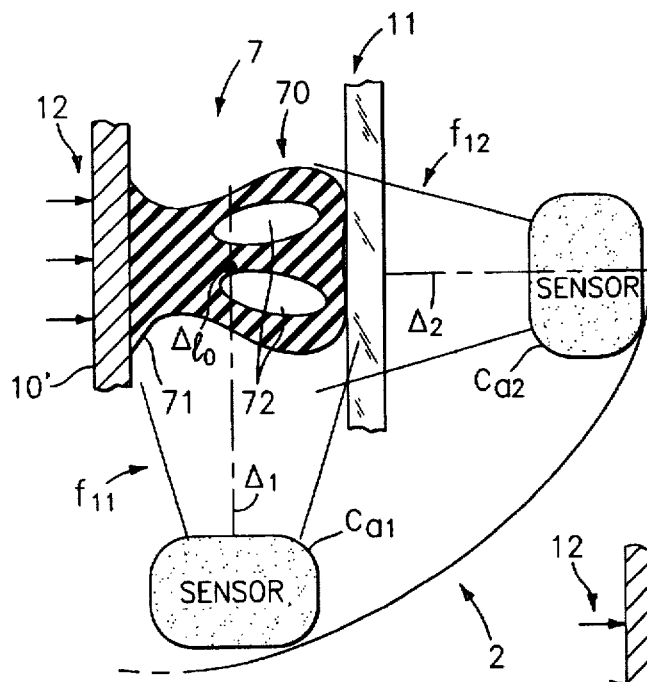
FIGS. 5a and 5b are diagrammatic representations of an acquisition and digitization system for monitoring the deformation of the above seal when loaded in compression.
Figure 5B:
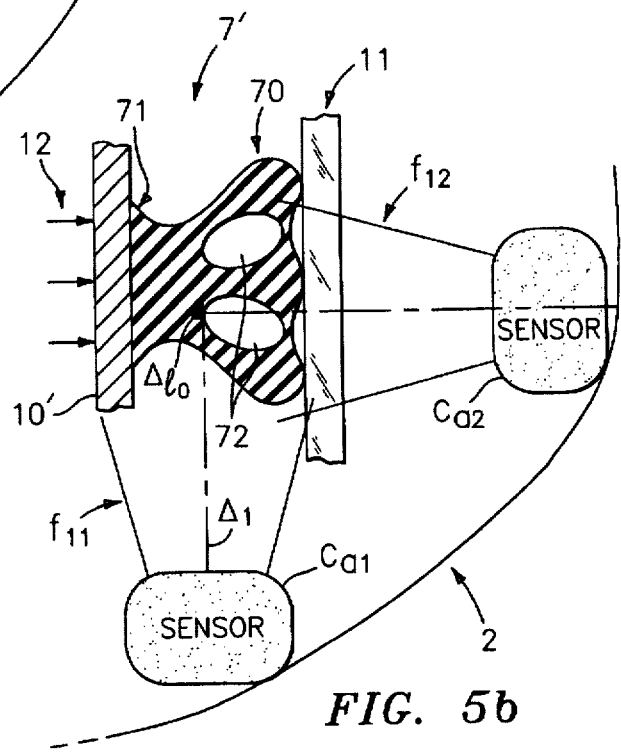

FIGS. 5a and 5b are diagrammatic representations of a digitizing system of the invention for carrying out this digitization.

The system essentially comprises two plates, an opaque plate 10 simulating the bodyshell of a vehicle (9 in FIGS. 4a and 4b) and a transparent material plate 11 simulating the door of the vehicle (8 and 8' in FIGS. 4a and 4b).

It also comprises two optical sensors $C_{a1}$ and $C_{a2}$ in accordance with the invention in the example shown. These emit laser beams $f_{11}$ and $f_{12}$ in directions $\Delta_1$ and $\Delta_2$ that are advantageously orthogonal. The beams $f_{11}$ and $f_{12}$ are naturally coplanar, in accordance with one feature of the invention.

The base 71 of the seal 7 is fixed to the opaque plate 10, under similar conditions to those that apply in the case of a vehicle. The head 70 of the seal is brought into contact with the transparent wall 11 simulating the door (the "door open" state is shown in FIG. 5a).

For technical convenience, the distance between the sensor $C_{a2}$ (observing the seal head 70 from above: along the axis $\Delta_2$) and the transparent wall 11 must remain constant once the system has been calibrated; it is therefore the opaque plate 10 that is moved, in a direction parallel to the direction $\Delta_2$, rather than the plate 11. It is clear that this does not distort in any way the behavior of the seal under load, since it is the relative movement of one plate 10 towards the other plate 11 that crushes the seal head 70 (position 7'), under conditions that are entirely similar to that of the real life situation. The compression loads encountered when the door (8' in FIG. 4b) is closed are therefore faithfully reproduced. FIG. 5b shows this "door closed" state (opaque plate at position 10'). The relative movement of one plate towards the other in translation is obtained by any appropriate conventional means 12 (linear motor, hydraulic piston, etc).

It will be readily understood that the profile of the seal 7, and more particularly that of the head area 70, can be digitized at rest (FIG. 5a) and displayed on a screen (not shown) since it is "seen" by the two sensors $C_{a1}$ and $C_{a2}$ directly (sensor $C_{a1}$) or through the transparent wall 11 (sensor $C_{a2}$). The digitization is carried out by the method of the invention, as previously described.

It can also be carried out in the fully compresses position (position 7' in FIG. 5b, with the opaque plate in position 11'), simulating the "door closed" position.

It can also be carried out in any intermediate position between these two extremes, and preferable continuously.

In this way it is possible to compare at all times the measured profile with a reference model, as designed by CAD, simulating the same loads.

If the differences measure exceed or fall short of predetermined limits, it is possible to feed back into the CAD process the actual data obtained from the measurement son the prototype (to repeat the calculation) and to execute as many iterations as necessary of the process as just describe to obtain a seal that behaves in accordance with the stated requirements.

The fact of using only two sensors, as shown in FIGS. 5a and 5b, does not enable a complete section to be acquired: the top of the head area 70 and one side only of the seal 7 can be observed and digitized. What is more, only the deformation of the head area 70 as seen from above and from one side is really of interest, the base 71 being fixed to the plate 11 (to the bodyshell 9) under real conditions of use). A third sensor could be added, however, to observe the other side of the seal 7.

As in the system for digitizing a human foot described with reference to FIG. 1, it is necessary to carry out an initial calibration phase. A process similar in all respects to that previously described with regard to FIG. 2 may be used. There is therefore no need to describe it again.

Again in a similar manner to what has been described already for the previously mentioned system, the system for digitizing the rubber seal includes signal processing circuits (not shown). The sensors are also mounted on a sensor support 2. If measurements must be carried out on a portion or on the whole of the seal 7, it is necessary to provide drive means for the sensor support cradle 2, for example along a longitudinal axis $\Delta_{10}$ orthogonal to the axes $\Delta_1$ and $\Delta_2$. These drive means may be similar to those described with reference to FIG. 1.

A reading of the above description confirms that the invention achieves the stated objectives.

It should be clear, however, that the invention is not limited to the embodiments previously described, in particular with reference to FIGS. 1 through 3. Specifically, although the system is a multisensor system in one preferred embodiment, enabling the acquisition of and the digitization of a complete section of an object in a single pass, the system of the invention may include a single optical sensor if it is not necessary to acquire and to digitize a complete section of an object. This is the case, for example, with digitizing the sole of a foot.

It should also be clear that, although particularly suited to the applications just described by way of example, the invention is not limited to such applications. It applies also to the acquisition and the digitization of any object through a transparent surface.

There is claimed:

1. Method of acquiring and digitizing an object through a transparent wall using at least one sensor comprising a laser source emitting a lamellar beam towards said object forming a measurement laser plane and at least one camera observing said object through said transparent wall, said at least one sensor being fixed to a mobile sensor support, said transparent wall being of constant thickness and having a profile that can be scanned continuously by an individual laser plane orthogonal to one surface of said transparent wall, along a particular axis, said method comprising at least the following phases:

a preliminary phase comprising at least the following steps:

a/ defining a measuring space encompassing said object to be acquired and digitized;

b/ digitizing said transparent wall in order to determine geometric characteristics thereof relative to a frame of reference;

c/ defining a displacement profile along said particular axis, including said at least one sensor relative to said axis so that said individual laser plane from said at least one sensor remains at all times perpendicular to said one surface of said transparent wall, and calibrating all of said measurement space by means of a calibration pattern moving perpendicular to said transparent wall along said particular axis;

d/ translating coordinate data acquired and digitized in the above manner into an absolute frame of reference and storing said translated coordinate data in memory; and a phase of acquisition and digitization of said object comprising at least the following steps:

a/ displacing said sensor support along said particular axis in accordance with said displacement profile so that said measurement laser plane remains perpendicular to said transparent wall;

b/ acquiring and digitizing all or part of sections of said object in successive slices;

c/ translating the coordinate data obtained in the above manner to said absolute frame of reference by correlation with said data obtained by calibration of said measurement space and stored in memory.

2. Method according to claim 1 wherein said measurement laser plane is the combination of particular individual laser planes created by a plurality of optical sensors fixed to said sensor support and partially or totally surrounding said object and said preliminary phase includes a supplementary step of making the individual laser planes emitted by said lasers coplanar so as to form a single measurement laser plane.

3. Method according to claim 1 wherein said transparent wall is plane.

4. Method according to claim 1 wherein said transparent wall has surfaces which are regulated by parallel straight line segments perpendicular to said particular axis.

5. Method according to claim 1 wherein said transparent wall has surfaces which are cylindrical.

6. Method according to claim 1 wherein said transparent wall has surfaces which are surfaces of revolution developed from a regular curve by rotation about a common axis.

7. Method according to claim 4 wherein said step of digitizing said transparent wall comprises the following phases:

a/ a phase of calibrating a plurality of sensors comprising the following steps:

turning off the laser beams of the sensor under said transparent wall and turning on sensors above said transparent wall;

calibrating cameras of the sensors above said transparent wall, said sensor support and said calibration pattern remaining immobile, for one section only of said space and determining calibration parameters from a single calibration of said calibration pattern;

b/ a phase of digitizing said transparent wall comprising the following steps:

temporarily blanking a top surface of said transparent wall so as to render it temporarily opaque, in whole or in part, so that it can be seen by said sensors;

scanning said top surface with said common laser plane without rotation of the latter;

determining a working area so as to be able to eliminate in a subsequent phase unwanted points that may be plotted below the top surface of said transparent wall.

8. Method according to claim 6 wherein said step of digitizing said transparent wall comprises the following phases:

a/ a sensor calibration phase comprising the following steps:

removing said transparent wall;

turning off the laser beams from a plurality of sensors under said transparent wall, and turning on sensors on top of said transparent wall;

calibrating cameras of the sensors above said transparent wall, said sensor carrier and said calibration pattern remaining immobile, for a single section of said space and determining calibration parameters of a single digitization of said calibration pattern which is moved beforehand into an area of the space occupied by said transparent wall before said transparent wall is removed;

b/ a phase of digitizing said transparent wall comprising the following steps:

temporarily blanking a bottom surface of said transparent wall to render it temporarily opaque in whole or in part so that it can be seen by said sensors;

scanning said bottom surface with said common laser plane without rotation of the latter;

determining a working area to enable elimination in a subsequent phase of unwanted points that may be plotted under the top surface of said transparent wall;

determining said top surface of said transparent wall from said bottom surface.

9. Method according to claim 7 wherein said step of digitizing said transparent wall includes the acquisition of the following geometrical parameters at any point $p_i$ on said face in a direction parallel to said particular axis:

the abscissa $x_i$ of the intersection of a straight line segment perpendicular to said face at $p_i$ along an abscissa axis relative to an origin abscissa $x_o$ forming a reference;

the angle $\alpha_i$ between said perpendicular straight line segment at $p_i$ and said abscissa axis; and the distance $v_i$ between said intersection and said point $p_i$.

10. Method according to claim 9 wherein said abscissa $x_i$ and said angle $\alpha_i$ are measured by measuring the displacement of said pattern along said particular axis and by measuring the rotation of said measurement laser plane.

11. Method according to claim 10 wherein said pattern remains at all times on the face opposite the sensors during said calibration so as to follow the surface thereof and is coupled to a displacement sensor to measure the distance $v_i$ between said intersection and said point $p_i$.

12. Method according to claim 2 wherein, for each slice, a complete section of said object is acquired and digitized in a single pass.

13. System comprising a set of optical sensors mounted on a sensor support in the form of a cradle mobile in translation along a first particular axis and in rotation about a second particular axis orthogonal to the first, each sensor comprising a laser source omitting a lamellar beam forming a particular measurement laser plane, the set of particular measurement laser planes being coplanar to form a single measurement laser plane, and at least one camera observing an object, a non-plane support forming a transparent wall on which said object rests, at least some of said sensors being disposed under said support, means for moving said sensor support in translation along said first particular axis and tilting said sensor support about said second particular axis, and signal processing and data storage means controlling said translation and tilt means in accordance with a displacement profile determined during a preliminary phase of digitization of said transparent wall and of calibration of a measurement space, so that said single measurement laser plane is displaced perpendicularly to said transparent wall, and receiving from cameras associated with said sensor signals for acquisition and digitization of successive sections of said object, each section corresponding to one slice.

14. System according to claim 13 comprising four sensors and a guide rail parallel to said first particular axis and wherein said translation and tilt means comprise a first motor driving said sensor support along said rail and a second motor tilting said sensor support about said second axis.

15. System according to claim 13 wherein said signal processing and data storage means further comprise a visualization unit for real time monitoring of the acquisition and digitization of successive sections of said object.

16. System according to claim 13 wherein a test pattern in the form of a transparent wall incorporating pins arranged in a regular matrix organization is used to carry out an initial calibration and wherein said pattern is attached to said sensor support so as to move therewith.

17. System according to claim 16 wherein said test pattern is mounted on rolling means and follows and upper face of said support.

18. System according to claim 17 wherein said test pattern is coupled to a sensor responsive to displacement in a direction perpendicular to said support.

19. The method according to claim 2 further comprising applying said method to the acquisition and the digitization of the shape of a human foot in order to collect data needed to make shoes to measure.

20. The method according to claim 2 further comprising applying said method to the continuous acquisition and digitization of sections of a compressible seal to provide a seal between a bodyshell and a door exerting loads on said seal when closed.

21. The method according to claim 20 wherein said seal is disposed between an opaque plane support and a transparent wall, said opaque plane support is moved in translation towards said transparent wall in order to apply compression loads simulating said loads exerted on said seal by said door in its closed position, and said acquisition and digitization of sections of said seal are effected continuously during said movement in translation.

* * * * *